(12) United States Patent
Hirabayashi

(10) Patent No.: US 9,306,466 B2
(45) Date of Patent: Apr. 5, 2016

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 251 days.

(21) Appl. No.: 13/957,013

(22) Filed: Aug. 1, 2013

(65) Prior Publication Data

US 2014/0043869 A1      Feb. 13, 2014

(30) Foreign Application Priority Data

Aug. 10, 2012   (JP) ................. 2012-178352

(51) Int. Cl.
| | |
|---|---|
| *H02M 1/44* | (2007.01) |
| *H02M 3/338* | (2006.01) |
| *H02M 3/335* | (2006.01) |
| *H02M 1/36* | (2007.01) |
| *H02M 1/00* | (2007.01) |

(52) U.S. Cl.
CPC .............. *H02M 3/3385* (2013.01); *H02M 1/44* (2013.01); *H02M 3/33507* (2013.01); *H02M 1/36* (2013.01); *H02M 2001/0032* (2013.01); *Y02B 70/16* (2013.01)

(58) Field of Classification Search
CPC .......... H02M 2001/0032; H02M 1/44; H02M 3/335; H02M 3/3385; H02M 1/36; H02M 3/33507; H02M 3/33523
See application file for complete search history.

(56) References Cited

U.S. PATENT DOCUMENTS

| | | | | |
|---|---|---|---|---|
| 6,166,926 | A * | 12/2000 | Nath et al. ................. | 363/21.03 |
| 6,285,566 | B1 * | 9/2001 | Nakahira et al. ............ | 363/19 |
| 6,288,914 | B1 * | 9/2001 | Sato .......................... | 363/18 |
| 6,862,193 | B2 | 3/2005 | Nakata | |
| 2002/0027787 | A1 * | 3/2002 | Nishida et al. ............. | 363/21.16 |
| 2002/0075085 | A1 * | 6/2002 | Nishida et al. ............. | 331/36 C |
| 2003/0214820 | A1 * | 11/2003 | Nakata ....................... | 363/21.01 |
| 2010/0149840 | A1 * | 6/2010 | Hayasaki et al. .......... | 363/21.09 |
| 2011/0311260 | A1 * | 12/2011 | Nakajima et al. ........... | 399/88 |
| 2012/0140530 | A1 * | 6/2012 | Nemoto ..................... | 363/21.12 |

FOREIGN PATENT DOCUMENTS

JP       3697218 B2    9/2005

\* cited by examiner

*Primary Examiner* — Fred E Finch, III
(74) *Attorney, Agent, or Firm* — Fitzpatrick, Cella, Harper & Scinto

(57) ABSTRACT

The power supply apparatus includes a switch element for turning ON and OFF supply of electric power to a primary winding of a transformer; a determining unit connected to an auxiliary winding of the transformer, for determining an ON-time of the switch element; and a switching unit for switching the ON-time determined by the determining unit.

9 Claims, 8 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus, and more particularly, to realize soft start and solve a problem of noise in a ringing choke converter.

2. Description of the Related Art

A ringing choke converter (hereinafter referred to as "RCC"), which is a self-excited circuit, is formed only of discrete components and is inexpensive, and is therefore widely used as a power supply of 150 W or less. FIG. 8 illustrates a circuit example of a conventional RCC. The RCC of FIG. 8 includes a primary smoothing capacitor C51, capacitors C52 to C54, transistors Q52 and Q53, a MOSFET Q51 (hereinafter referred to as "main switch element Q51"), and a diode D51. The RCC of FIG. 8 further includes a flyback transformer T51, a photocoupler PC51, an operational amplifier OP51, a Zener diode VZ51, and resistors R501 to R509. As a power saving technology for the RCC, there is known a method of applying a pulse signal to the transistor Q53 to forcibly stop self-excited continuous oscillation and change to intermittent oscillation so as to increase efficiency in a light load state, as disclosed in Japanese Patent No. 3697218, for example.

The conventional RCC has a feature that a drain-source voltage of the main switch element Q51 becomes highest when the power supply starts up. The RCC determines a maximum ON-time of the main switch element Q51 based on a time constant of the resistor R504 and the capacitor C53. Once the main switch element Q51 is turned ON, the capacitor C53 is charged with a voltage generated in an auxiliary winding of the flyback transformer T51. Then, when the voltage of the capacitor C53 exceeds a threshold of a base-emitter voltage of the transistor Q52, the transistor Q52 is turned ON and the main switch element Q51 is turned OFF.

In general, in the state in which an output voltage is obtained from the secondary side of the RCC, feedback control is performed by the operational amplifier OP51 so that a charge current flows to the capacitor C53 also via the resistor R509, and hence the ON-time of the main switch element Q51 is controlled to be shorter. Even when the output voltage reaches a maximum continuous output of the RCC, the capacitor C53 is charged because of minute light emission of an LED of the photocoupler PC51 obtained by an output offset voltage of the operational amplifier OP51, and hence the ON-time of the main switch element Q51 does not reach the maximum ON-time determined only by the resistor R504 and the capacitor C53. At the start-up of the power supply, however, the secondary side output voltage has not risen yet, and hence the ON-time of the main switch element Q51 becomes the maximum ON-time determined only by the resistor R504 and the capacitor C53. Thus, a peak value of a drain current flowing when the main switch element Q51 is turned OFF becomes maximum, and hence a surge of the drain-source voltage of the main switch element Q51 caused by leakage inductance of a primary winding of the flyback transformer T51 becomes maximum as well.

To deal with this, the values of the resistor R504 and the capacitor C53 are set so that the drain-source voltage on this occasion may satisfy the absolute maximum rating of the main switch element Q51. As a result, the maximum output after the start-up becomes an output that can be supplied in an ON-time shorter than the maximum ON-time at the time of start-up. In other words, the performance cannot be fully utilized. If the maximum ON-time at the time of start-up can be set to be equal to or shorter than a maximum ON-time under a maximum load after the start-up, the maximum output can be increased even with the same MOSFET and the same transformer, which is advantageous.

Another problem is that humming noise is heard from the transformer when the intermittent oscillation operation is performed as disclosed in, for example, Japanese Patent No. 3697218. The intermittent oscillation operation means the repetition of start-up and stop, and the main switch element Q51 is driven with the above-mentioned maximum ON-time at the time of start-up, and hence a change in magnetic flux of the main transformer becomes the largest. The oscillation frequency during the start-up decreases to enter the audible range and becomes audible by a user as raspy noise. In general, countermeasures for noise are taken by impregnating the transformer with epoxy or the like. However, this effect is limited and the cost is increased, and hence the advantage of the RCC as being inexpensive is lost.

SUMMARY OF THE INVENTION

The present invention has been made in view of the above-mentioned circumstances, and is capable of reducing a drain-source voltage of a main switch element at the time of start-up and reducing noise generated in an intermittent oscillation operation.

According to one embodiment of the present invention, a purpose of the present invention it to provide a power supply apparatus, including: a transformer including a primary winding, a secondary winding, and an auxiliary winding; a switch element for turning ON and OFF supply of electric power to the primary winding, a determining unit connected to the auxiliary winding, for determining an ON-time of the switch element, and a switching unit for switching the ON-time determined by the determining unit in accordance with an output voltage of the secondary winding.

Further, according to one embodiment of the present invention, the purpose of the present invention is to provide a power supply apparatus, including a transformer including a primary winding, a secondary winding, and an auxiliary winding; a switch element for turning ON and OFF supply of electric power to the primary winding; a determining unit connected to the auxiliary winding, for determining an ON-time of the switch element; and a switching unit for switching the ON-time determined by the determining unit.

According to one embodiment of the present invention, the purpose of the present invention is to provide an image forming apparatus for forming an image on a recording material, including a power supply for supplying electric power to the image forming apparatus, the power supply including: a transformer including a primary winding, a secondary winding, and an auxiliary winding; a switch element for turning ON and OFF supply of electric power to the primary winding; a determining unit connected to the auxiliary winding, for determining an ON-time of the switch element; and a switching unit for switching the ON-time determined by the determining unit in accordance with an output voltage of the secondary winding.

Further features of the present invention will become apparent from the following description of exemplary embodiments with reference to the attached drawings.

DESCRIPTION OF THE EMBODIMENTS

Modes for carrying out the present invention are described in detail below by way of embodiments.

First Embodiment

Configuration of Power Supply Apparatus

Figure 1:
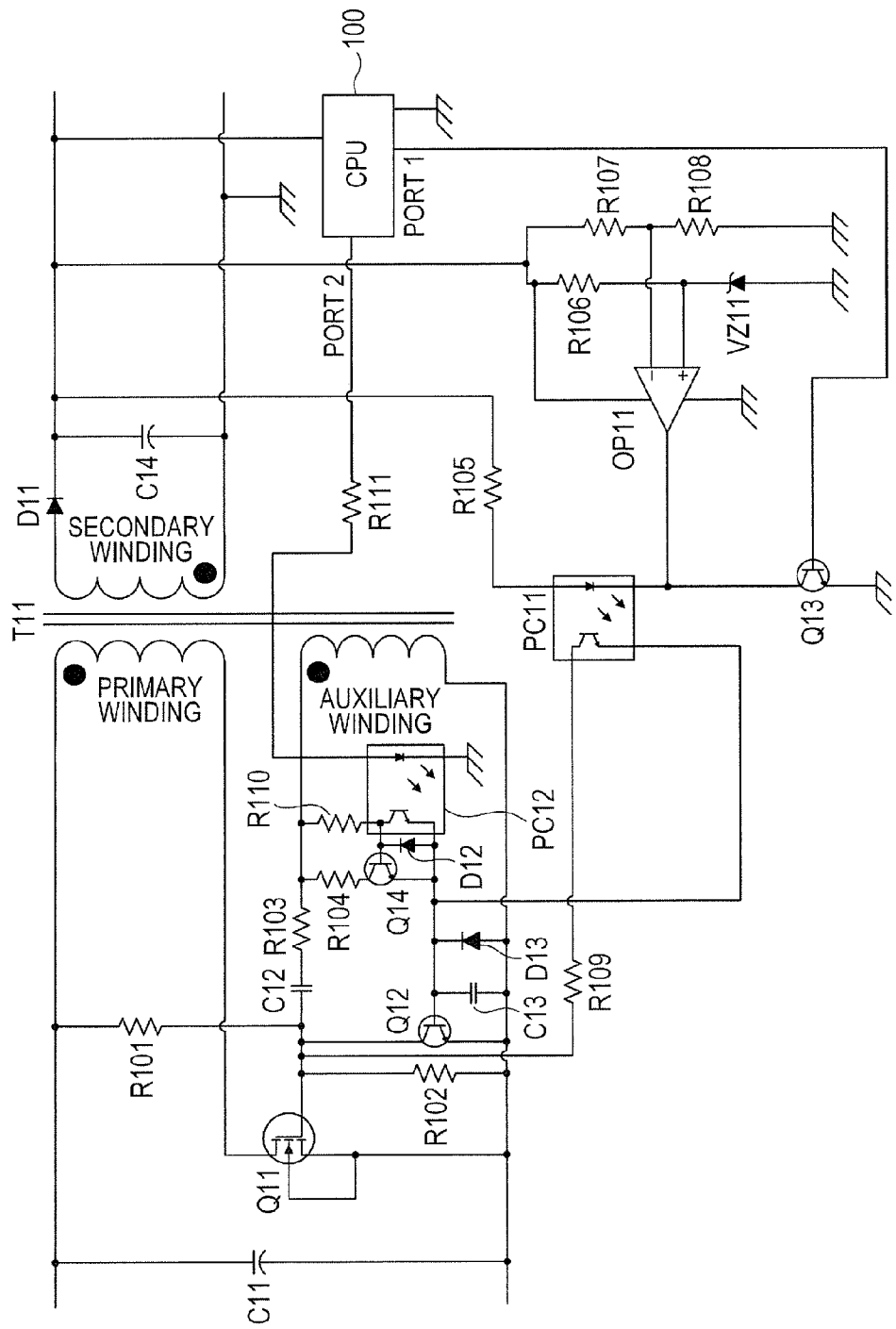
FIG. 1 is a circuit diagram of a power supply apparatus according to a first embodiment of the present invention.

FIG. 1 illustrates a circuit diagram of a ringing choke converter (hereinafter referred to as "RCC"), which is a self-excited circuit as a power supply apparatus according to a first embodiment of the present invention. The RCC according to this embodiment includes capacitors C11 to C14, resistors R101 to R111, a MOSFET Q11 (hereinafter referred to as "main switch element Q11"), transistors Q12 to Q14, and diodes D11 to D13. The RCC according to this embodiment further includes a flyback transformer (hereinafter referred to simply as "transformer") T11, a Zener diode VZ11, photocouplers PC11 and PC12, an operational amplifier OP11, and a central processing unit (hereinafter referred to as "CPU") 100. The transformer T11 includes a primary winding, a secondary winding, and an auxiliary winding.

The diode D11 and the capacitor C14 form a rectifying and smoothing circuit for rectifying and smoothing a voltage generated in the secondary winding of the transformer T11. The resistors R107 and R108, the operational amplifier OP11, the resistor R106, and the Zener diode VZ11 form an error detection circuit for comparing an output voltage of the rectifying and smoothing circuit with a reference voltage and outputting a voltage corresponding to a difference therebetween. The resistor R105 and the photocoupler PC11 form a transmission circuit for transmitting information on the secondary side, which is an output of the error detection circuit, to the primary side. The photocoupler PC12, the resistor R104, the resistor R110, the capacitor C13, the diode D12, and the transistor Q14 form a determination circuit for determining an ON-time of the main switch element Q11, which is a feature of this embodiment.

In the RCC according to this embodiment, the CPU 100 outputs a signal for controlling the RCC to execute an intermittent oscillation operation from an output terminal Port1 to the transistor Q13. As the characteristic configuration of this embodiment, an output terminal Port2 of the CPU 100 is connected to an LED of the photocoupler PC12 via the resistor R111. The CPU 100 is capable of controlling the photocoupler PC12 by outputting a signal of a predetermined level to the output terminal Port2. In other words, the CPU 100 functions as a switching unit for switching the ON-time determined by the determination circuit connected to the auxiliary winding of the transformer T11 in accordance with the output voltage of the secondary winding of the transformer T11.

Next, the operation of the RCC of FIG. 1 is described with reference to a timing chart of FIG. 2.

Operation of Power Supply Apparatus

Figure 2:
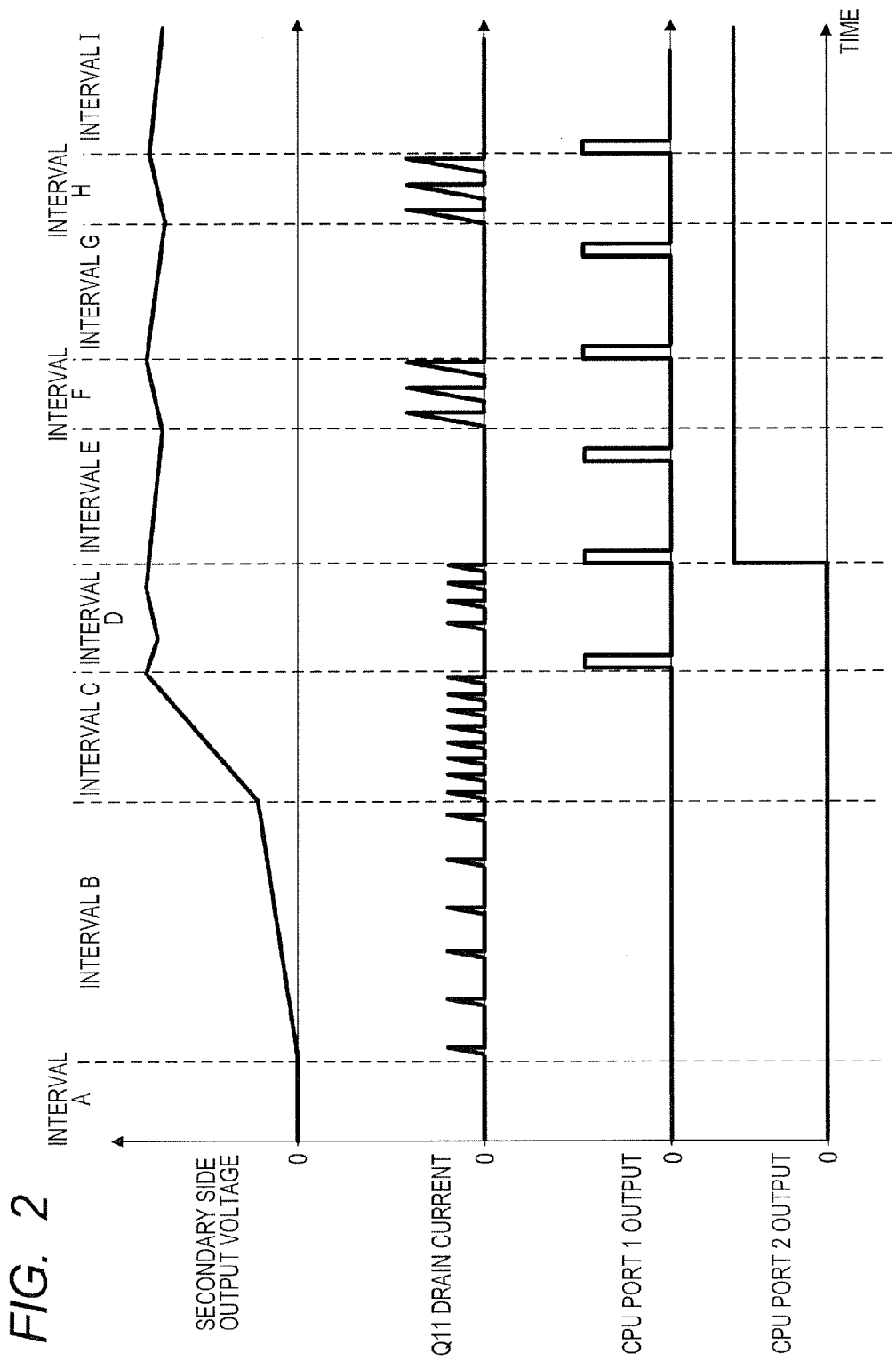
FIG. 2 is a timing chart of the power supply apparatus according to the first embodiment of the present invention.

FIG. 2 shows a secondary side output voltage, a drain current of the main switch element Q11, an output of the output terminal Port1 of the CPU 100, and an output of the output terminal Port2 of the CPU 100 from top down.

(Interval A)

In FIG. 2, an interval A is a condition where the power supply circuit according to this embodiment is not connected to a commercial power source and is not started up yet. The secondary side output voltage is zero, and the CPU 100 whose power source is this output voltage is stopped, and hence the CPU 100 outputs no signal. Thus, the output from the output terminal Port2 of the CPU 100 is also Low level, and the photocoupler PC12 is turned OFF.

(Interval B)

Next, when the power supply circuit according to this embodiment is connected to the commercial power source, the condition shifts to an interval B. In an initial stage where the commercial power source is connected, a current for raising a gate voltage of the main switch element Q11 is supplied from the start-up resistor R101. When the main switch element Q11 is turned ON, a current is allowed to flow through the primary winding of the transformer T11 to generate a voltage corresponding to a winding ratio in the auxiliary winding. The secondary winding of the transformer T11 has a winding direction reverse to that of the primary winding, and hence no current flows through the secondary winding by being blocked by the diode D11. In this case, the CPU 100 is also stopped, and hence the output of the output terminal Port2 of the CPU 100 is Low level. Thus, the LED of the photocoupler PC12 emits no light because the secondary side output voltage is zero, and hence a phototransistor of the photocoupler PC12 is also turned OFF. Therefore, a current caused by the voltage generated in the auxiliary winding flows through the capacitor C13 from the resistor R110 via the base and the emitter of the transistor Q14. Then, the transistor Q14 is turned ON, and a current flows through the capacitor C13 also from the resistor R104 via the collector and the emitter of the transistor Q14. In other words, the resistor R104 and the resistor R110 are connected in parallel.

When the voltage of the capacitor C13 increases with time to exceed a threshold voltage of a base-emitter voltage of the transistor Q12, the transistor Q12 is turned ON. When the transistor Q12 is turned ON, a gate-source voltage of the main switch element Q11 is decreased, and hence the main switch element Q11 is turned OFF. In the interval B, a peak value of the drain current of the main switch element Q11 is smaller than that in the case where the capacitor C13 is charged only from the resistor R110.

When the main switch element Q11 is turned OFF, the transformer T11 discharges stored energy, and hence a voltage whose polarity is opposite to the above is generated in the secondary winding. Then, the secondary side diode D11 becomes conductive, and the capacitor C14 starts to be charged. When all the energy stored in the transformer T11 is discharged, the voltages generated in the respective windings are inverted again due to free oscillation. A voltage that turns ON the main switch element Q11 is generated also in the auxiliary winding of the transformer T11, but on this occasion, the secondary side output voltage has risen little, and hence the voltage generated in the auxiliary winding in this case cannot turn ON the main switch element Q11. As a result, unless the secondary side output voltage increases to a certain extent, the main switch element Q11 can be turned ON only by the current supplied from the start-up resistor R101.

This condition corresponds to the interval B. It takes time for the main switch element Q11 to be turned ON by the current supplied from the start-up resistor R101, and hence the drain current of the main switch element Q11 has a waveform in which the distance between waves is large.

(Interval C)

In an interval C, along with the increase in secondary side output voltage, the voltage generated in the auxiliary winding due to free oscillation reaches a voltage sufficient for turning ON the main switch element Q11, and hence the main switch element Q11 can be turned ON again without depending on the current from the start-up resistor R101. The condition where the main switch element Q11 is continuously turned ON and OFF in this manner is referred to as "continuous oscillation condition". Thus, as compared to the interval B in which the main switch element Q11 is turned ON only by the start-up resistor R101, it takes less time for the main switch element Q11 to be turned ON, and hence the drain current of the main switch element Q11 in the interval C has a waveform in which the distance between waves is shorter than that in the interval B.

In the interval C, the output from the output terminal Port2 of the CPU 100 is Low level, and hence the photocoupler PC12 is turned OFF. Thus, similarly to the interval B, a current flows to the capacitor C13 via the resistor R110 and the resistor R104, and hence it takes less time for the transistor Q12 to be turned OFF, and the ON-time of the main switch element Q11 is short. Therefore, the peak value of the drain current of the main switch element Q11 is smaller than that in the case where the capacitor C13 is charged only from the resistor R110.

(Interval D)

In an interval D, the secondary side output voltage reaches a target value, and the operational amplifier OP11 performs feedback control. At the same time, the CPU 100 starts up, and outputs a pulse signal from the output terminal Port1 in order to improve efficiency. When the CPU 100 outputs a signal of High level from the output terminal Port1, the transistor Q13 is turned ON so that the LED of the photocoupler PC11 emits light. Then, the phototransistor of the photocoupler PC11 is turned ON, and hence the transistor Q12 is turned ON, and the main switch element Q11 is turned OFF. Thus, the continuous oscillation condition is forcibly interrupted, and hence the power supply apparatus enters again the condition where the power supply apparatus is to be started up by the current supplied from the resistor R101. In this way, the CPU 100 outputs a signal of High level intermittently from the output terminal Port1, to thereby control the power supply apparatus to be repeatedly started up and stopped so that the ratio of the stopped state is increased to improve the efficiency in the light load state. The condition where the main switch element Q11 is intermittently turned ON and OFF in this manner is referred to as "intermittent oscillation condition". After the interval D, the CPU 100 outputs a pulse signal from the output terminal Port1, and the RCC performs the intermittent oscillation operation. The secondary side output voltage of the transformer T11 has reached a target voltage, and hence, after the interval D, the RCC performs constant voltage control while performing the intermittent oscillation operation.

In this case, in the interval D, the CPU 100 outputs a signal of Low level from the output terminal Port2, and hence, similarly to the interval B and the interval C, the peak value of the drain current of the main switch element Q11 is smaller than that in the case where the capacitor C13 is charged only from the resistor R104. In this way, in the interval D corresponding to the intermittent oscillation condition, the peak value of the drain current is small, and hence humming noise generated from the transformer T11 can be reduced in the interval D. Note that, the cause of generating the humming noise is described later.

(Interval E)

In an interval E, the CPU 100 changes the output of the output terminal Port2 from Low level set in the interval A to the interval D to High level. Then, the LED of the photocoupler PC12 is turned ON, and the phototransistor of the photocoupler PC12 is turned ON to short-circuit the base and the emitter of the transistor Q14. Then, the transistor Q14 is turned OFF, and only the resistor R110 corresponds to a current supply path to the capacitor C13. Thus, it takes more time for the voltage of the capacitor C13 to rise as compared with the case where the CPU 100 outputs the signal of Low level from the output terminal Port2. As a result, the ON-time of the main switch element Q11 is extended.

As described above, until the interval D, the ON-time of the main switch element Q11 is determined based on a time constant of the resistors R104 and R110 and the capacitor C13. In other words, the time constant is determined by a combined resistance of the resistors R104 and R110 connected in parallel and the capacitance of the capacitor C13. On the other hand, after the interval E, the signal of High level is output from the output terminal Port2 of the CPU 100, and hence the configuration is switched so that the ON-time of the main switch element Q11 is determined based on a time constant of the resistor R110 and the capacitor C13. In other words, in this embodiment, the resistance of the resistor that determines the time constant is switched, to thereby switch the time constant that determines the ON-time of the main switch element Q11.

Note that, in an interval E, no oscillation is performed. This is because the secondary side output voltage is so higher than a target value that the oscillation is suppressed by normal feedback control of the operational amplifier OP11. In other words, in the interval E, the transistor Q12 is turned ON by the error detection circuit and the transmission circuit, and the main switch element Q11 is turned OFF so that the drain current is also 0. When the secondary side output voltage decreases with time, the suppression of the oscillation by the operational amplifier OP11 is released, and the oscillation restarts by a current from the start-up resistor R101. This condition corresponds to the next interval F.

(Interval F)

In the interval F, the effect of the extended ON-time of the main switch element Q11 obtained by switching the time constant is exerted. As shown in FIG. 2, because the ON-time of the main switch element Q11 is extended, the peak value of the drain current becomes higher than those in the interval B to the interval D. Thus, the power supply apparatus can obtain a larger output than that in the interval D, which is the same intermittent oscillation condition.

In the interval B and the interval C as the intervals for the start-up of power supply, the ON-time of the main switch element Q11 is limited to be short, and hence the oscillation frequency is high. Thus, by setting the oscillation frequency in those intervals to be higher than the audible range of humans, the humming noise heard at the time of start-up or in the intermittent oscillation operation can be reduced. In an interval G and subsequent intervals, the operations in the intervals E and F are repeated.

(Cause of Generating Humming Noise)

Now, a description is given of the humming noise heard at the time of start-up or in the intermittent oscillation operation. The humming noise is caused by vibration of the winding or core of the transformer T11, and the vibration is produced by magnetic flux. Accordingly, by suppressing a maximum value of the magnetic flux generated per switching operation to be small, the vibration can be suppressed to reduce the humming noise. Here, the magnetic flux φ is expressed by "φ=LI" (L: inductance, I: current value), and hence, by decreasing the current value I, the vibration can be suppressed to reduce the humming noise. Thus, in this embodiment, the peak value of the drain current of the main switch element Q11 is decreased, in other words, the ON-time of the main switch element Q11 is shortened. Then, in order to shorten the ON-time of the main switch element Q11 at the start-up of power supply, in this embodiment, the CPU 100 controls the photocoupler PC12 to be turned ON and OFF so as to switch the time constant of the circuit including the resistor and the capacitor connected to the auxiliary winding. With this configuration, when the secondary side output voltage at the start-up of power supply is 0 or low, the CPU 100 turns OFF the photocoupler PC12. Then, the ON-time of the main switch element Q11 is determined based on the time constant of the resistors R104 and R110 and the capacitor C13, and hence the ON-time of the main switch element Q11 is shortened.

In this embodiment, the CPU 100, which is configured to be stopped or started up in accordance with the secondary side output voltage, outputs the signal for controlling the photocoupler PC12 to be turned ON and OFF from the output terminal Port2, to thereby switch the path of the current flowing through the capacitor C13 in accordance with the turning ON and OFF of the photocoupler PC12. Note that, switching the path of the current flowing through the capacitor C13 can be rephrased as switching the time constant. In this embodiment, the CPU 100 switches the time constant that determines the ON-time of the main switch element Q11 and thereby limits the maximum ON-time of the main switch element Q11 at the start-up of power supply.

As described above, according to this embodiment, the RCC can be provided with a soft start function by adding a small number of components, and countermeasures can be taken for noise in the intermittent oscillation operation. Thus, the breakdown derating of the main switch element Q11 as the MOSFET can be increased or the maximum output of the RCC can be increased. Further, the effort for impregnating the transformer T11 and taking countermeasures for noise of the power supply can be reduced to lead to the low cost. In this way, at the start-up of the power supply apparatus (interval B and interval C), the signal of Low level is output from the output terminal Port2 of the CPU 100 to shorten the ON-time of the main switch element Q11, to thereby reduce the drain-source voltage. Then, in the intermittent oscillation operation (interval D), the signal of Low level is output from the output terminal Port2 of the CPU 100 to shorten the ON-time of the main switch element Q11, to thereby reduce the humming noise. In conclusion, according to this embodiment, the drain-source voltage of the main switch element at the time of start-up can be reduced, and the noise generated in the intermittent oscillation operation can be reduced.

Second Embodiment

Figure 3:
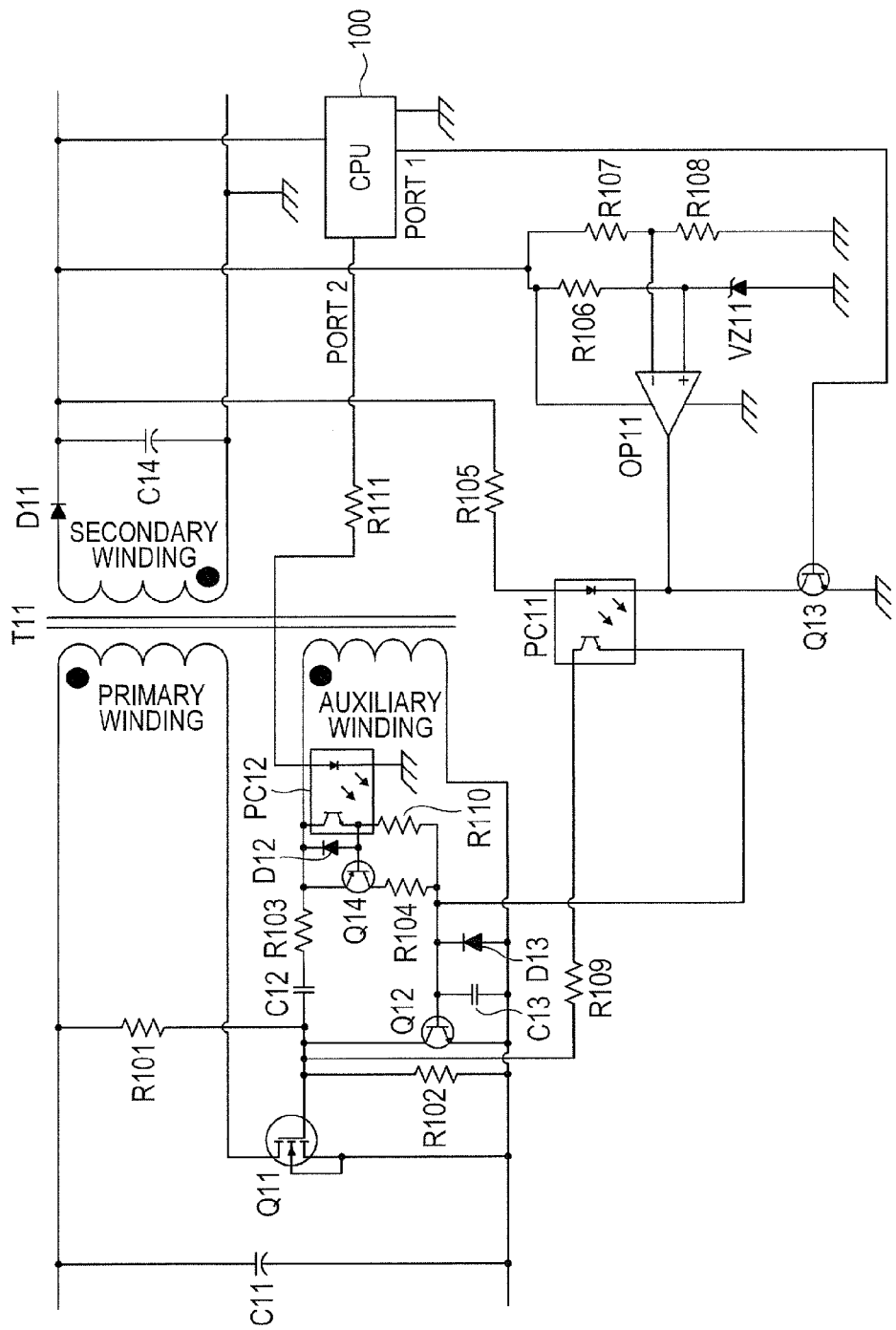
FIG. 3 is a circuit diagram of a power supply apparatus according to a second embodiment of the present invention.

FIG. 3 illustrates a configuration of an RCC according to a second embodiment of the present invention. In this embodiment, the transistor Q14 of the first embodiment is changed to a PNP transistor, and the connection relationship among the resistors R104 and R110, the diode D12, and the photocoupler PC12 is changed. Thus, the same configurations as those of FIG. 1 of the first embodiment are denoted by the same reference symbols to omit descriptions thereof. The overall operation is the same as that of the first embodiment, and hence a description thereof is omitted.

In this embodiment, the transistor Q14 is turned ON when a signal of Low level is output from the output terminal Port2 of the CPU 100 so that the LED of the photocoupler PC12 is turned OFF and the phototransistor of the photocoupler PC12 is turned OFF. In this case, a current is allowed to flow through the resistor R110 via an emitter and a base of the transistor Q14, and a current also flows through the resistor R104. In other words, this condition corresponds to the interval A to the interval D described with reference to FIG. 2.

On the other hand, when a signal of High level is output from the output terminal Port2 of the CPU 100 to turn ON the LED of the photocoupler PC12, the phototransistor of the photocoupler PC12 is turned ON to short-circuit the emitter and the base of the transistor Q14. Thus, the transistor Q14 is turned OFF. As a result, a current supply path for charging the capacitor C13 is only a path via the resistor R110. In other words, this condition corresponds to the interval E and subsequent intervals described with reference to FIG. 2.

In this embodiment, with the configuration of FIG. 3, the time constant that determines the ON-time of the main switch element Q11 is switched by the photocoupler PC12 in accordance with the output signal from the output terminal Port2 of the CPU 100. In this way, according to this embodiment, the drain-source voltage of the main switch element at the time of start-up can be reduced, and the noise generated in the intermittent oscillation operation can be reduced.

Third Embodiment

Figure 4:
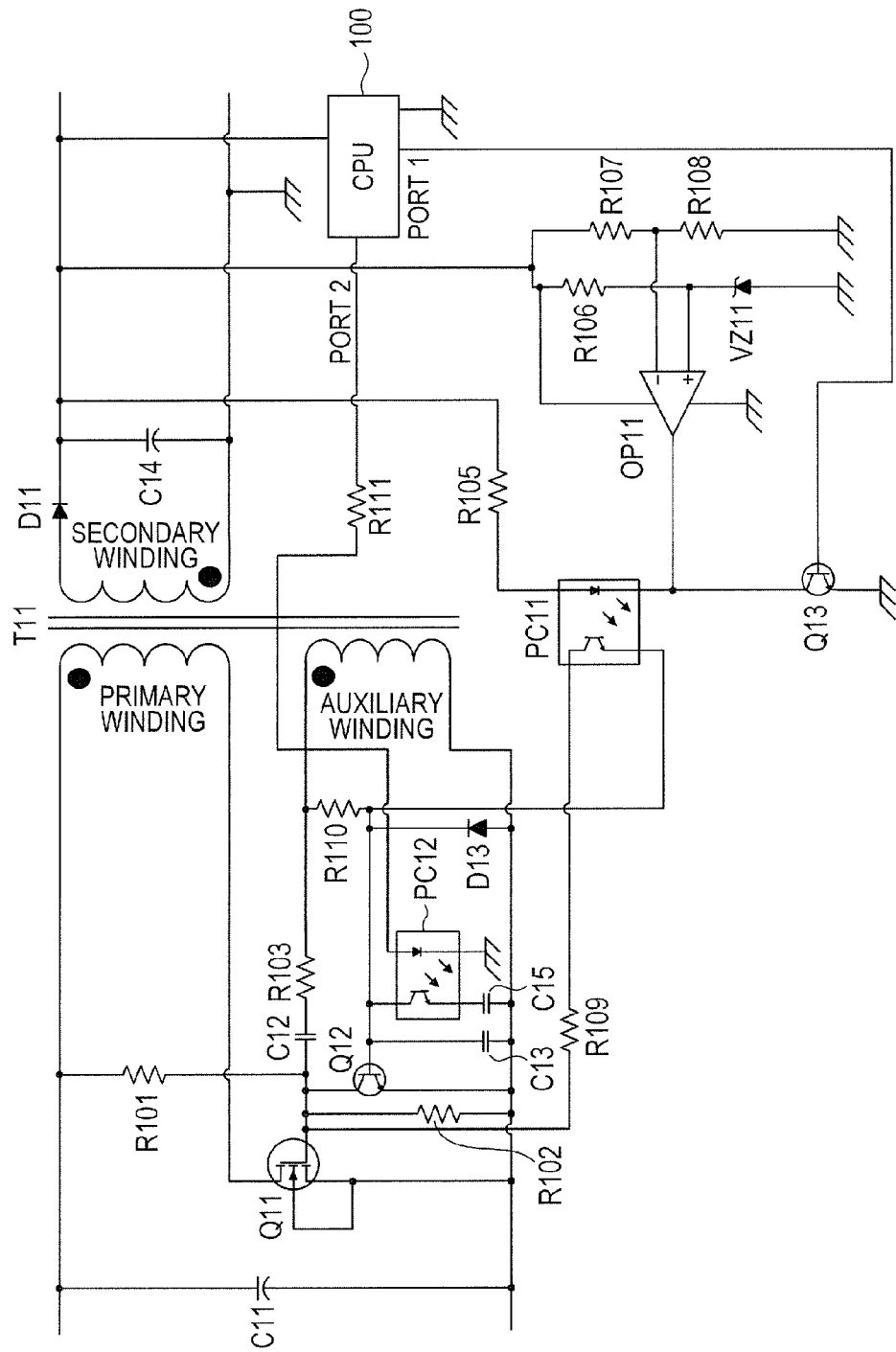
FIG. 4 is a circuit diagram of a power supply apparatus according to a third embodiment of the present invention.

FIG. 4 illustrates a configuration of a power supply apparatus according to a third embodiment of the present invention. In this embodiment, as compared to the first embodiment, the method of changing the maximum ON-time of the main switch element Q11 is changed from the switching of the resistor to the switching of the capacitor. Specifically, the resistor R104, the transistor Q14, and the diode D12 are deleted from the first embodiment, and in this embodiment, the connection destination of the photocoupler PC12 is changed and a capacitor C15 is added. Note that, the same configurations as those of FIG. 1 of the first embodiment are denoted by the same reference symbols to omit descriptions thereof.

The CPU 100 outputs a signal of Low level from the output terminal Port2 to turn OFF the LED of the photocoupler PC12 and thereby turn OFF the phototransistor of the photocoupler PC12. When the photocoupler PC12 is turned OFF, all the current flowing through the resistor R110 charges the capacitor C13. In other words, the ON-time of the main switch element Q11 is determined based on a time constant of the resistor R110 and the capacitor C13. Note that, this condition corresponds to the interval D and prior intervals described with reference to FIG. 2.

On the other hand, the CPU 100 outputs a signal of High level from the output terminal Port2 to turn ON the LED of the photocoupler PC12 and thereby turn ON the photodiode of the photocoupler PC12. When the photocoupler PC12 is turned ON, the current flowing through the resistor R110 charges the capacitor C13 and the capacitor C15. In other words, when the LED of the photocoupler PC12 is turned ON, the configuration is switched so that the ON-time of the main switch element Q11 is determined based on a time constant of the resistor R110 and the capacitors C13 and C15. In this way, in this embodiment, the capacitance of the capacitor that determines the time constant is switched, to thereby switch the time constant that determines the ON-time of the main switch element Q11. Then, it takes more time for the base-emitter voltage of the transistor Q12 to rise, and hence the ON-time of the main switch element Q11 can be lengthened. Thus, the effect similar to that of the first embodiment can be obtained. Note that, this condition corresponds to the interval E and subsequent intervals described with reference to FIG. 2.

In conclusion, according to this embodiment, the drain-source voltage of the main switch element at the time of start-up can be reduced, and the noise generated in the intermittent oscillation operation can be reduced.

Fourth Embodiment

Figure 5:
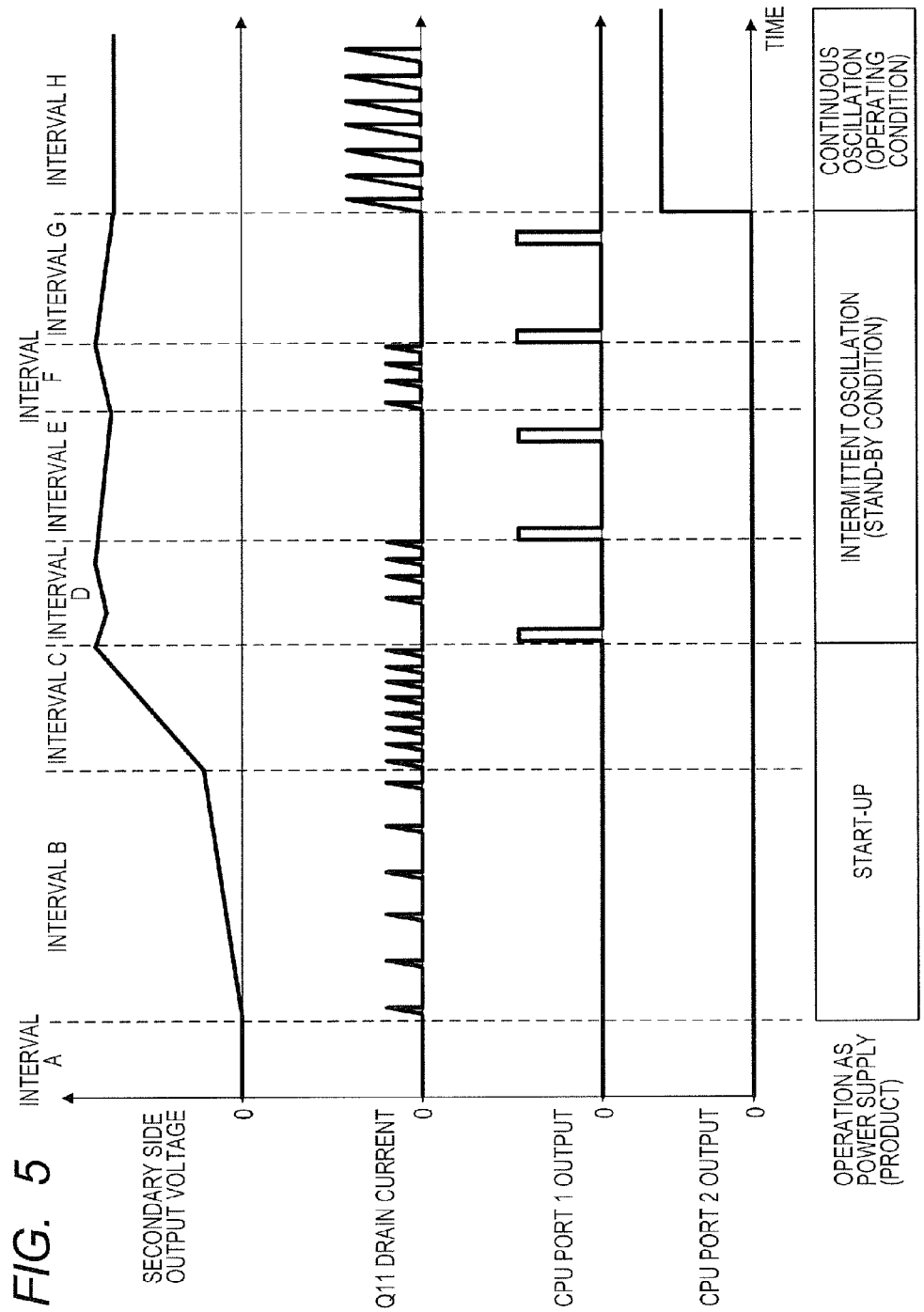
FIG. 5 is a timing chart of a power supply apparatus according to a fourth embodiment of the present invention.

FIG. 5 illustrates a timing chart of a power supply apparatus according to a fourth embodiment of the present invention. Note that, the power supply apparatus according to this embodiment has the same circuit diagram as that of FIG. 1 of the first embodiment, and hence a description thereof is omitted. The feature of the first embodiment resides in that a surge of the drain-source voltage of the main switch element Q11 at the time of start-up can be suppressed and that a relatively large output can be extracted in the intermittent oscillation condition (such as the interval F of FIG. 2). On the other hand, this embodiment exemplifies a method of reducing humming noise in the intermittent oscillation condition in return for suppressing the output that can be extracted in the intermittent oscillation condition.

In FIG. 5, the intervals A to D are the same as those of the first embodiment, and hence descriptions thereof are omitted. Regarding the intervals E to G, the output signal of the output terminal Port2 of the CPU 100 is High level in the first embodiment, but in this embodiment, the output signal of the output terminal Port2 of the CPU 100 is still set to Low level similarly to the interval D and prior intervals. With this setting, in all the intervals D to G corresponding to the intermittent oscillation condition, the ON-time of the main switch element Q11 can be set to remain short. In this way, the variation width of the drain current is small and the variation amount of magnetic flux is also small, and hence the humming noise is reduced.

On the other hand, when a large output needs to be extracted from the secondary side, for example, as indicated by the interval H, the output signal of the output terminal Port2 of the CPU 100 is set to High level. By lengthening the ON-time of the main switch element Q11 in this way and by setting the output signal of the output terminal Port1 of the CPU 100 to Low level, the input of a pulse signal to the transistor Q13 is stopped to perform the continuous oscillation operation. As a result, a maximum output as the power supply apparatus can be obtained. In this way, the CPU 100 sets the output signal of the output terminal Port2 to Low level when the reduction in humming noise is given priority, and sets the output signal of the output terminal Port2 to High level when the acquisition of a large output is given priority.

As described above, in this embodiment, the CPU 100 is configured to arbitrarily control the LED of the photocoupler PC12 to be turned ON. Thus, for example, when the power supply apparatus according to this embodiment is mounted in a product, the control method for the intervals D to G can be applied in a stand-by condition where no heavy load is imposed on the product, and the control method for the interval H can be applied in a product operating condition where a large output is necessary. Then, in the product having the power supply apparatus according to this embodiment mounted therein, both high efficiency and low humming noise can be achieved in the stand-by condition, and a large output can be extracted in the operating condition. Note that, the operation as the power supply (product) is shown in FIG. 5. For example, the RCC is in the start-up condition in the interval B and the interval C, in the intermittent oscillation condition (also the stand-by condition) in the interval D to the interval G, and in the continuous oscillation condition (operating condition) in the interval H. Note that, the configuration according to this embodiment may be applied to the configuration in which the transistor Q14 is a PNP transistor as described in the second embodiment or the configuration in which the time constant is switched by switching the capacitance of the capacitor as described in the third embodiment.

In conclusion, according to this embodiment, the drain-source voltage of the main switch element at the time of start-up can be reduced, and the noise generated in the intermittent oscillation operation can be reduced.

Fifth Embodiment

Figure 6:
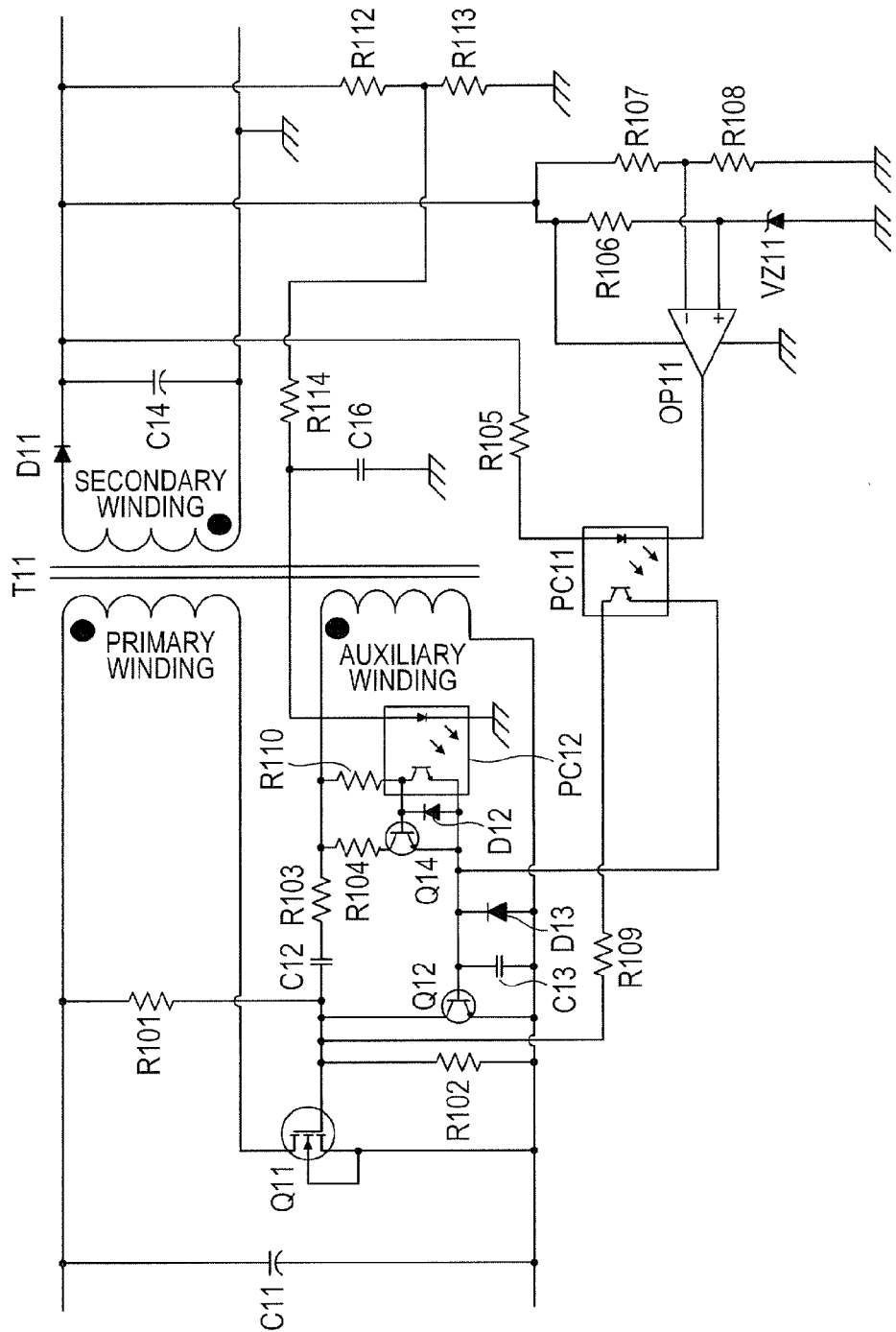
FIG. 6 is a circuit diagram of a power supply apparatus according to a fifth embodiment of the present invention.

FIG. 6 illustrates a circuit diagram of a power supply apparatus according to a fifth embodiment of the present invention. In the power supply apparatus according to this embodiment, the CPU 100 is deleted from FIG. 1 of the first embodiment, and instead, the secondary side output voltage is divided by a resistor R112 and a resistor R113, and the divided voltage is directly connected to the LED of the photocoupler PC12 via an integral circuit formed of a resistor R114 and a capacitor C16. In other words, the resistor R112 and the resistor R113 function as a switching unit for switching the ON-time determined by the determination circuit connected to the auxiliary winding of transformer T11 in accordance with the output voltage of the secondary winding of the transformer T11. Note that, the same configurations as those of FIG. 1 of the first embodiment are denoted by the same reference symbols to omit descriptions thereof.

The constants of those components are set as follows. First, the resistor R112 and the resistor R113 are set as follows. The resistor R112 and the resistor R113 are a circuit for determining a timing of turning ON the LED of the photocoupler PC12. Accordingly, the voltage division ratio is set so that a voltage generated in the resistor R113 may be equal to or higher than a forward voltage of the LED of the photocoupler PC12 when the secondary side output voltage becomes a desired voltage.

The integral circuit formed of the resistor R114 and the capacitor C16 is used for providing a time difference so that the LED of the photocoupler PC12 may not be turned ON before the start-up of the power supply apparatus is completed. In this way, soft start at the start-up of power supply can be realized even with the configuration without the CPU 100.

Specifically, before the start-up, the secondary side output voltage is zero, and hence the photocoupler PC12 remains turned OFF and the ON-time of the main switch element Q11 remains short as described in the first embodiment. Thus, the power supply starts up under the state in which the drain-source voltage is suppressed. On the other hand, when the secondary side output voltage has sufficiently risen to complete the start-up, the LED of the photocoupler PC12 is turned ON by the voltage divided by the resistor R112 and the resistor R113. In this case, the LED of the photocoupler PC12 is turned ON with a predetermined time difference by the integral circuit formed of the resistor R114 and the capacitor C16. When the LED of the photocoupler PC12 is turned ON, the suppression of the ON-time of the main switch element Q11 is released, and hence a large output can be obtained.

Note that, the configuration according to this embodiment may be applied to the configuration in which the transistor Q14 is a PNP transistor as described in the second embodiment or the configuration in which the time constant is switched by switching the capacitance of the capacitor as described in the third embodiment.

In conclusion, according to this embodiment, the drain-source voltage of the main switch element at the time of start-up can be reduced, and the noise generated in the intermittent oscillation operation can be reduced.

Sixth Embodiment

The RCC as the power supply apparatus described in the first to fifth embodiments is applicable as, for example, a low voltage power supply of an image forming apparatus, that is, a power supply for supplying electric power to a controller (control unit) or a driving unit such as a motor. A description is now given of a configuration of the image forming apparatus to which the power supply apparatus according to the first to fifth embodiments is applied.

Configuration of Image Forming Apparatus

Figure 7:
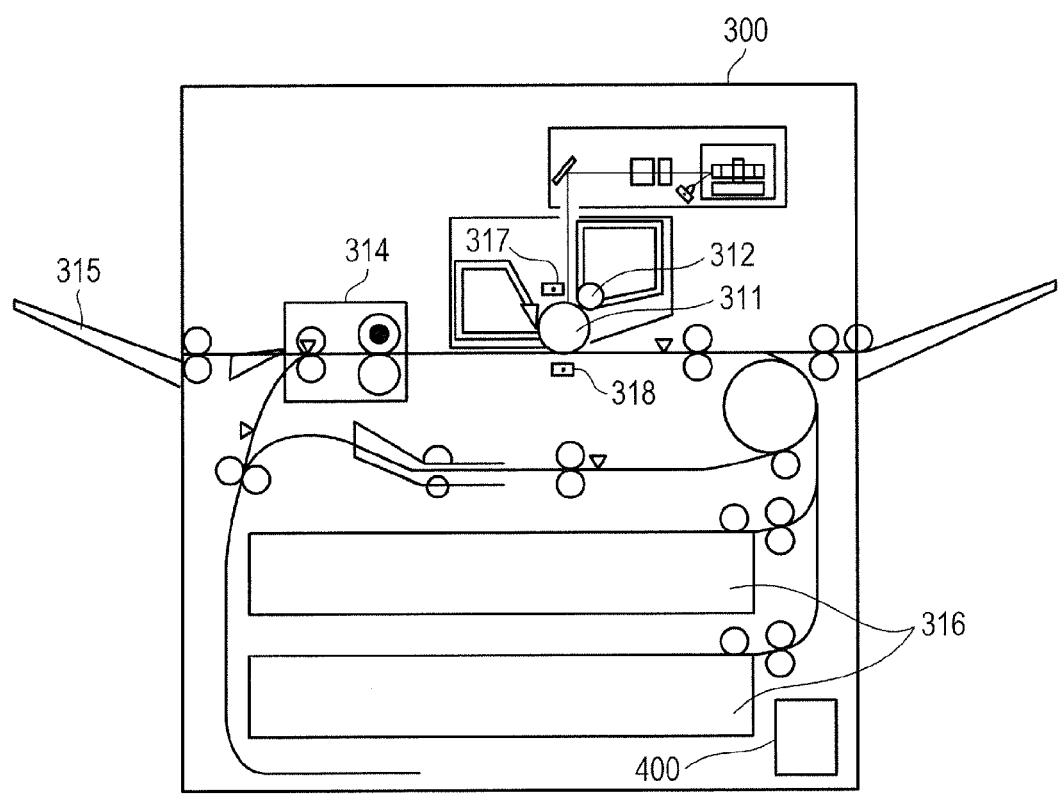
FIG. 7 is a diagram illustrating an image forming apparatus according to a sixth embodiment of the present invention.
Figure 8:
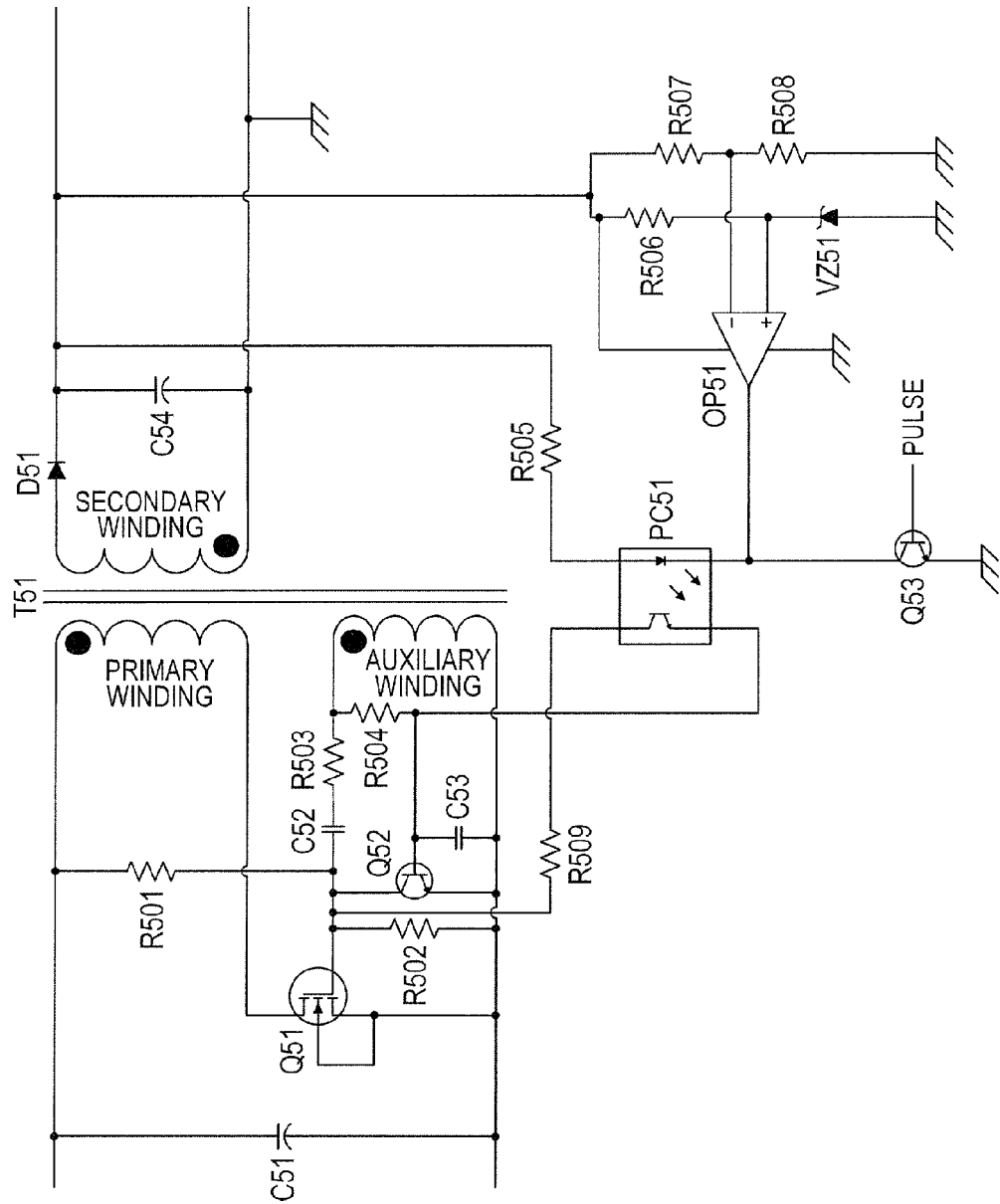
FIG. 8 is a circuit diagram of a conventional power supply apparatus.

A laser beam printer is described as an example of the image forming apparatus. FIG. 7 illustrates a schematic configuration of the laser beam printer as an example of an electrophotographic printer. A laser beam printer 300 includes a photosensitive drum 311 as an image bearing member on which an electrostatic latent image is to be formed, a charge unit 317 for uniformly charging the photosensitive drum 311, and a developing unit 312 for developing the electrostatic latent image formed on the photosensitive drum 311 with toner. A toner image developed on the photosensitive drum 311 is transferred by a transfer unit 318 onto a sheet (not shown) as a recording material supplied from a cassette 316. The toner image transferred onto the sheet is fixed by a fixing unit 314 and is discharged to a tray 315. The photosensitive drum 311, the charge unit 317, the developing unit 312, and the transfer unit 318 correspond to an image forming unit. The laser beam printer 300 further includes an RCC 400 as the power supply apparatus described in the first to fifth embodiments. The image forming apparatus to which the RCC 400 according to the first to fifth embodiments is applicable is not limited to the one exemplified in FIG. 7. For example, the image forming apparatus may include multiple image forming units. Alternatively, the image forming apparatus may include a primary transfer unit for transferring the toner image formed on the photosensitive drum 311 onto an intermediate transfer belt, and a secondary transfer unit for transferring the toner image formed on the intermediate transfer belt onto a sheet.

The laser beam printer 300 includes a controller (not shown) for controlling an image forming operation of the image forming unit and a sheet conveyance operation. The RCC 400 described in the first to fifth embodiments supplies electric power to, for example, the controller. The RCC 400 described in the first to fifth embodiments supplies electric power also to a driving unit such as a motor for rotating the photosensitive drum 311 or driving various kinds of rollers for conveying a sheet.

The image forming apparatus according to this embodiment includes the RCC 400 having a soft start function described in the first to fifth embodiments. With this, in the image forming apparatus according to this embodiment, the drain-source voltage of the main switch element Q11 of the RCC 400 can be reduced at the start-up of the power supply, namely, when the supply of electric power from the commercial power source is started. The image forming apparatus according to this embodiment can also reduce power consumption by reducing the load, such as by supplying electric power only to the controller, in the case where the image forming apparatus is in a stand-by condition for realizing power saving (for example, power saving mode or stand-by mode). In other words, in the image forming apparatus according to this embodiment, in the power saving mode, the RCC 400 described in the first to fifth embodiments performs the intermittent oscillation operation in the light load state. Then, when the image forming apparatus operates in the power saving mode, the humming noise generated from the RCC 400 can be reduced by the configuration described in the first to fifth embodiments.

In conclusion, according to this embodiment, in the power supply apparatus applied to the image forming apparatus, the drain-source voltage of the main switch element at the time of start-up can be reduced and also the noise generated in the intermittent oscillation operation can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178352, filed Aug. 10, 2012, which is hereby incorporated by reference herein in its entirety.

What is claimed is:

1. A power supply apparatus, comprising:
a transformer including a primary winding, a secondary winding, and an auxiliary winding;
a switch element connected to the primary winding for turning ON and OFF supply of electric power to the primary winding according to an output voltage of the secondary winding; and
a setting unit connected to the auxiliary winding and the switch element for setting a turn-on time period in which the switch element turns on,
wherein the setting unit has a capacitor configured to determine the turn-on time period, a first resistor element connected to the capacitor in series, a second resistor element connected to the first resistor element in parallel and a switch connected to the second resistor element in series,
wherein in a start-up time of a power supply apparatus, the setting unit switches a condition of the switch from turn-on to turn-off to prolong the turn-on time period of the switch element.

2. A power supply apparatus according to claim 1, further comprising a detection unit for detecting the output voltage of the secondary winding,
wherein the power supply apparatus controls a timing of a turn-on of the switch element in accordance with a signal according to the output voltage detected by the detection unit.

3. A power supply apparatus according to claim 1, wherein the switch is turned on in a case where the output voltage output from the secondary winding reaches a predetermined value after the power supply apparatus starts up.

4. A power supply apparatus comprising:
a transformer including a primary winding, a secondary winding, and an auxiliary winding;
a switch element connecting to the primary winding for turning ON and OFF supply of electrical power to the primary winding according to an output voltage of the secondary winding; and
a setting unit connected to the auxiliary winding and the switch element for setting a turn-on time period in which the switch element turns on, wherein the setting unit has a first capacitor configured to determine the turn-on time period, a first resistor element connected to the first capacitor in series, a second capacitor connected to the first capacitor in parallel and a switch connected to the second capacitor in series, and wherein in a start-up time of a power supply apparatus, the setting unit switches a condition of the switch from turn-on to turn-off to prolong the turn-on time period of the switch element.

5. The power supply apparatus according to claim 4, wherein the switch is turned on in a case where the output voltage output from the secondary winding reaches a predetermined value after the power supply apparatus starts up.

6. An image forming apparatus for forming an image on a recording material, comprising a power supply for supplying electric power to the image forming apparatus, the power supply comprising:

a transformer including a primary winding, a secondary winding, and an auxiliary winding;

a switch element connecting to the primary winding for turning ON and OFF supply of electric power to the primary winding according to an output voltage of the secondary winding; and a setting unit connected to the auxiliary winding and the switch element for-setting a turn-on time period in which the switch element turns on, wherein the setting unit has a capacitor configured to determine a turn-on time period, a first resistor element connected to the capacitor in series, a second resistor element connected to the first resistor element in parallel and a switch connected to the second resistor element in series, and wherein in a start-up time of a power supply apparatus, the setting unit switches a condition of the switch from turn-on to turn-off to prolong the turn-on time period of the switch element.

7. The image forming apparatus according to claim 6, further comprising a controller configured to control an operation of an image forming unit for forming the image, and a driving unit for driving the image forming unit, wherein the power supply supplies a power to the controller or the driving unit.

8. An image forming apparatus for forming an image on a recording material, comprising a power supply for supplying electric power to the image forming apparatus, the power supply comprising:

a transformer including a primary winding, a secondary winding, and an auxiliary winding;

a switch element connected to the primary winding for turning ON and OFF supply of electric power to the primary winding according to an output voltage of the secondary winding; and a setting unit connected to the auxiliary winding and the switch element for setting a turn-on time period in which the switch element turns on, wherein the setting unit has a first capacitor configured to determine a turn-on time period, a first resistor element connected to the first capacitor in series, a second capacitor connected to the first capacitor in parallel and a switch connected to the second capacitor in series, and wherein in a start-up time of a power supply apparatus, the setting unit switches a condition of the switch from turn-on to turn-off to prolong the turn-on time period of the switch element.

9. The image forming apparatus according to claim 8, further comprising a controller configured to control an operation of an image forming unit for forming the image, and a driving unit for driving the image forming unit, wherein the power supply supplies a power to the controller or the driving unit.

\* \* \* \* \*